UNITED STATES PATENT OFFICE 2,548,505

ACTIVATORS FOR p QUINONE DIOXIME CURES

Luther B. Turner, Roselle Park, and Winthrope C. Smith, Westfield, N. J., assignors to Standard Oil Development Company, a corporation of Delaware No Drawing. Application August 29, 1946, Serial No. 693,814

10 Claims. (Cl. 260—23.7)

This invention relates to the curing of elastomers; relates particularly to mixtures containing quinone dioximes as curing agents for elastomers; and relates especially to the curing of a low temperature interpolymer of isobutylene and a diolefin by the application thereto of mixtures of a quinone dioxime and a chlorosulphonamide.

A very effective curing agent for a wide range of elastomers, particularly the low temperature isobutylene-diolefin interpolymers is found in the quinone dioximes, in admixture with an inorganic oxidizing agent such as lead peroxide. These mixtures are, however, somewhat unsatisfactory because of the discoloration exerted by the lead salt, and because of the relatively slow action, especially at room temperature.

It is now found that a very limited group of colorless, organic oxidizing substances are efficient and effective curing aids. These substances are the chlorosulphonamides generally. The preferred substances are dichloro toluene sulphonamide and the sodium salt of chloro toluene sulphonamide, which are sold on the market as "Dichloramine T" and "Chloroamine T" respectively; these two substances being found to be particularly effective as curing aids in the curing action; the desired elastomer to be treated with both the quinone dioxime and the chlorosulphonamide to obtain a rapid and effective cure of the desired elastomer at any temperature, from room temperature to about 350° F. and either in the solid form or in solution.

Thus, according to the present invention, a desired elastomer such as the low temperature interpolymer of isobutylene with a diolefin; or an emulsion polymer of butadiene, isoprene, or the like, either alone or with a copolymerizate such as styrene or acrylonitrile; or natural rubber; or the like, is treated either on the mill, or in solution, with a mixture of a quinone dioxime such as para quinone dioxime, with a chlorosulphonamide to yield a cured elastomer of good tensile strength, and good elongation at break with a minimum of discoloration of the elastomer and a rapid, efficient and effective curing action. Other objects and details of the invention will be apparent from the following description:

Any of the common elastomers (as defined by Fisher in his article of the August 1939 issue of "Industrial and Engineering Chemistry," on page 941 under the heading "Nomenclature of Synthetic Rubbers") are suitable as raw materials for the present invention. The preferred elastomer is the low temperature interpolymer of isobutylene with a multi olefin having from 4 to 14 carbon atoms per molecule such as butadiene, isoprene, dimethyl butadiene, myrcene, dimethallyl, or the like. This copolymer is prepared by cooling the olefinic material to a temperature within the range between —40° C. and —103° C.; the mixture being made up with a major proportion of isobutylene and a minor proportion of the diolefin; then treating the cold mixture with a solution of a Friedel-Crafts catalyst in solution in a low-freezing, non-complex-forming solvent, such as a solution of aluminum chloride in a halo-substituted aliphatic compound such as ethyl or methyl chloride or ethylene dichloride or chloroform, or the like, as shown in United States Patents #2,356,127 and #2,356,128.

The reaction proceeds promptly to yield the desired copolymer. It may be noted that in this reaction the preferred iso-olefin is isobutylene but that a wide choice of multiolefins is possible as above pointed out.

For the catalyst, any of the Friedel-Crafts catalysts disclosed by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used. The solvent to be low-freezing must have a freezing point below 0° C.; to be non-complex-forming, there shall not separate from the solution on evaporation of the solvent a compound between the solvent and the Friedel-Crafts catalyst. All of the aliphatic halo-substituted compounds having freezing points below 0° C. are useable as catalyst solvents without regard to the number of halo-substituents or the the particular halogen used, and for the purposes of this application all are defined as "alkyl halides." Similarly, carbon disulfide and its analogs and homologs are also useable. With some of the Friedel-Crafts compounds, especially boron trifluoride, and aluminum bromide, the lower hydrocarbons such as ethane, ethylene, propane, butane, and the like are also excellent catalyst solvents since they also are low-freezing and non-complex-forming. In addition to the active metal halides disclosed by Calloway, a considerable number of double salts are equally effective catalysts, including such substances are aluminum chlorobromide which has the potency of aluminum chloride and is soluble in hydrocarbons. Similarly, such compounds as aluminum or titanium chloro ethoxide are also useable as catalysts in this reaction.

The resulting polymer is a solid having a

Staudinger molecular weight number within the range between about 20,000 and 150,000; a minimum molecular weight of about 20,000 being necessary for a curing reaction. The preferred range of molecular weight is from 35,000 to about 85,000, since polymers lower than 35,000 are undesirably low in tensile strength, and polymers above 85,000 are too tough to mill readily. The polymer likewise shows a relatively very low iodine number (according to the Wijs' method) of from 0.5 to 50, the preferred range being between about 1 and 10. (The polymer, in spite of its very low unsaturation, is readily reactive with sulfur, particularly in the presence of curing aids such as tetra methyl thiuram disulfide, in a curing reaction to yield a high-grade elastomer suitable for many of the uses to which rubber has previously been put.)

Alternatively, the emulsion interpolymers of butadiene with styrene or acrylonitrile; or of isoprene, either alone or with styrene or acrylonitrile; or dimethyl butadiene, alone or with styrene or acrylonitrile, are also useable as the basic elastomer. Likewise, the emulsion polymers of chloroprene, are similarly useful. That is, any of the curable rubber substances shown in the above-mentioned Fisher article as curable elastomers are suitable for use as the raw material for the present invention.

For many purposes it is desirable to use these elastomers in the form of "cements"; that is in solution in a solvent such as light naphtha, the material being cured either before or after evaporation of the solvent. For this purpose, the elastomer is conveniently dissolved in naphtha, with appropriate addition agents such as stearic acid, zinc oxide, and any pigments which may be desired including clay, whiting, barytes, chalk, carbon black, and the like. This mixture may, if desired, include small quantities of dinitroso curing agents, usually less than 1%, and will include substantial amounts of an appropriate quinone dioxime. Appropriate and suitable dioxime for use as curing agents are well shown in U. S. Patent No. 2,393,321 to Haworth, and in U. S. Patent No. 2,170,191 to Fisher, including both para and meta compounds (it does not appear to be possible to prepare an ortho quinone), as well as the esters and salts.

A mixture containing such amounts of curing agents in solution in light naphtha is stable almost indefinitely at room temperature and shows little tendency to cure or "gel." To this mixture there may be added from 0.15 to 1.0 part by weight (per 100 of polymer) of the chlorosulphonamide substance used, and, depending upon the amount added, the mixture, if in solution, will gel in from 15 minutes to a few hours, yielding a good gel containing the hydrocarbon solvent. The resulting gel may contain all of the original solvent (except such amount as may have evaporated during the processing), and it shows little tendency towards syneresis, although the solvent evaporates from the gel quite readily. The gel is readily broken up and shows quite high adhesive properties, both as formed when the gel "sets" in container, or as allowed to set as a lamina between portions of material to be cemented.

Alternatively, a similar mixture may be prepared on the mill, in the absence of solvent, and the mixture cooled to the lower possible temperature on the mill, and then the chlorosulphonamide compound added, preferably in solution in a convenient alcohol such as propyl alcohol. It may be noted, however, that a mixture so prepared must be prepared very rapidly, and cooled as quickly as possible, since the material shows pronounced scorchy tendencies.

It may be noted that the chlorosulphonamides as a group are useful in this reaction, and that as a group they are substantially all white compounds, readily soluble in alcohol, both methyl, ethyl, propyl and butyl with no tendency to undergo color-producing or staining reactions. It may be noted that in the group the preferred chlorosulphonamides having a higher activity are preferably used in the form of alcoholic solution, since this yields a more rapid and more satisfactory dispersion of the curing aid into the elastomer compound. However, several of the other members of the group are directly hydrocarbon soluble and may be used without alcohol. The aryl sulfonamides are broadly the structures shown in the following formulae; the first formula showing the mono chlor compound in the form of the sodium salt, and the second formula showing the dichlor compound. It may be noted that the sodium salt shows a good solubility in alcohol and a much lower solubility in the elastomer substance, whereas the dichlor compound shows a relatively low solubility in alcohol and a much higher solubility in the elastomer substance.

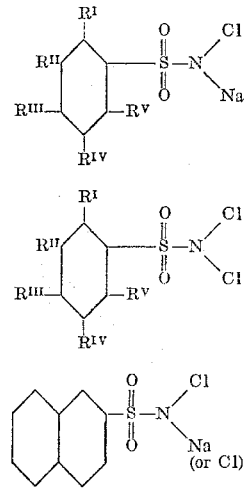

In these formulae, there are shown a series of substituents marked $R^I$, $R^{II}$, $R^{III}$, $R^{IV}$ and $R^V$. These substituents may be hydrogen or any convenient organic radical. If all of the R substituents are hydrogen, the compounds are mono or di-chloro benzene sulfon amide. If four of the R substituents are hydrogen and one is a methyl group, the compounds become mono or di-chloro toluene sulfon amide, there being three isomeric forms, all of which are useful. If one R substituent is an ethyl radical, the compounds become mono or di-chloro ethyl benzene sulfon amide; if propyl, the compounds become mono or di-chloro propyl benzene sulfon amide; in each instance there being the same three isomeric forms as with the methyl substituent. Tentative tests indicate that the limiting number of permissible carbon atoms in the substituent chain is quite high, probably more than six, possibly more than 10, and perhaps a dozen or even more; and it is not necessary that the substituent be an alkyl group, since an aryl group, to produce a mono or di-chloro phenyl benzene sulfon amide is equally useful. In the same way, two of the R substituents may be replaced by methyl groups yielding the mono and di-chloro xylene sulfon amides; and in this instance also the substituents may be not only two methyl groups, but two ethyl groups, two butyl groups, two phenyl groups, and the like; up to the same number of carbon atoms per radical; although some difficulty is occasionally encountered in the production of the compounds which may perhaps be attributed to steric hindrance. Similarly, the double ring of the naphthyl group may be used to produce the mono and di-chloro naphthyl sulfon amides, in which compounds also the ring hydrogens are replaceable by alkyl or aryl groups, although again steric hindrance may interfere with the manufacture of some of the compounds.

That is, the substances of the present invention, useable as aids or accelerators with a quinone dioxime consist of the whole family of sulfon amides, as above outlined.

EXAMPLE 1

A sample of the low temperature copolymer of isobutylene with isoprene containing approximately three molecular per cent of isoprene, characterized by an iodine number of approximately 1.5 and a Staudinger molecular weight of approximately 50,000 was dissolved according to the following recipe:

*Recipe 1*

|  | Parts by weight |
|---|---|
| Isobutylene-isoprene copolymer | 100 |
| Dinitroso benzene | 0.7 |
| Zinc oxide | 5 |
| Stearic acid | 3 |
| Sulfur | 1–5 |
| p-Quinone dioxime | 2 |
| Clay | 150 |
| Staybilite ester gum #10 | 20 |

(In this compound, the "Staybilite ester gum #10" is a glycerol ester of hydrogenated resin as described in Hercules Powder Company Sales Literature Form 928 5M3–43.)

The compound of the above recipe was prepared by dissolving the copolymer in a light naphtha, 54° naphtha being particularly suitable, and then the other materials were stirred in into a homogeneous suspension and solution in which the dinitroso benzene is soluble; the zinc oxide, sulphur and clay form good suspensions and part or all of the stearic acid, quinone dioxime and ester gum is dissolved, the amount of light naphtha being approximately 450 parts by weight, to yield a cement containing approximately 40% by weight of solids. This cement is stable substantially indefinitely at room temperature without vulcanizing or gelling.

Simultaneously a solution was prepared consisting of approximately 10 parts of chloroamine T in 100 parts of absolute ethyl alcohol. The chlorosulfonamide used was chloro toluene sulfonamide.

When the polymer was fully dissolved and the various other substances homogeneously suspended in it, samples were taken and treated with 3, 6 and 9 parts by weight per 100 parts of the above solution; well stirred in and the mixture allowed to set at room temperature. The portion containing 3 parts per 100 of the chloramine solution gelled in 4½ hours; the portion containing 6 parts gelled in two hours, and the portion containing 9 parts gelled in 15 minutes, the formation of the gel being indicative of a state of cure. Simultaneously, as soon as the chloramine solution had been well stirred in, portions of the mixtures were coated onto steel panels and the solvent allowed to evaporate. In each instance there were produced good vulcanized films insoluble in naphtha, of a good light buff color.

These results show the effective and speedy curing action of para quinone dioxime in the presence of chlorosulphonamides.

EXAMPLE 2

A similar compound according to Recipe 1 was prepared by throwing the polymer on the mill, milling it until it "banded" well, then added the zinc oxide, stearic acid, sulphur, clay and ester gum in small portions, cutting the band back and forth across the face of the roll until a thorough homogeneous mixture was obtained. This mixing was obtained on a comparatively hot mill. When the mixture was completed, the mill was cooled to about 80° C. and the quinone dioxime was added. When this stage was reached, the mill was cooled still further and varying amounts of the chloroamine compound were added to various parts of the polymer compound. These additions of chloroamine were made with the utmost possible speed and the material removed from the mill as quickly as reasonable mixing could be obtained. With 3 parts of chlorosulphonamide, not too much difficulty was encountered in mixing it in, getting the compound off the mill and cooled to room temperature before scorchiness interfered with the milling. With 6 parts considerable scorchiness was encountered and when 9 parts, a partly-cured material was obtained from the mill. All of these compounds were then readily cured to completion either merely by standing at room temperature, or by a relatively gentle heating.

It was found that this procedure was particularly effective for the preparation of insulated electric wire, since by preparing the basic compound on a mill, then placing the compound on a strip mill, adding the chlorosulphonamide to the strip mill, passing the strip directly to an extruder and extruding the polymer onto and around the copper wire, a little extra heating of the covered wire as it left the extruder completed the cure of the polymer, yielding a rubber-covered wire in a state of complete cure, without the necessity for mold curing.

EXAMPLE 3

A quantity of the low temperature copolymer of isobutylene with small amounts of isoprene was dissolved in hydrocarbon oil according to the following recipe:

*Recipe 2*

|  | Parts by weight |
|---|---|
| Copolymer | 100 |
| Quinone dioxime | 4 |
| Hydrocarbon oil 600–700° F. boiling range | 600 |

This material was found to be stable and of good keeping properties. Simultaneously, a solution was prepared consisting of 10 parts of dichlorotoluene sulfonamide in 100 parts by weight of benzene.

A mixture was then prepared of 100 parts by weight of the polymer solution with 2½ parts by weight of the chlorosulfonamide solution. The mixture gelled quite rapidly, in a relatively few minutes at room temperature to a firm gel. This material is excellently useable as a fuel in assisting jets for jet-propelled aircraft. That is, the gel forms a solid fuel of relatively very low volatility, which however, is immediately and readily available for high power production during combustion and, in addition, its disintegrates readily and burns rapidly to yield a high power output.

EXAMPLE 4

A synthetic rubbery copolymer of butadiene approximately 74% and acrylonitrile, approximately 26% was prepared by the usual emulsion technique utilizing soap as an emulsifier and a peroxide as a polymerization catalyst. This polymer was coagulated by acid and milled in the usual way. It was then compounded according to the following Recipe 3:

Recipe 3

| | Parts by weight |
|---|---|
| Butadiene-acrylonitrile copolymer | 100 |
| Stearic acid | 1.5 |
| Zinc oxide | 3 |
| Quinone dioxime dicaproate | 4.8 |
| Carbon black | 60 |

This material was prepared on a relatively hot mill with the quinone dioxime material withheld until all the other components were well milled in. The mill was then cooled, the quinone dioxime added as quickly as possible and then the mill was cooled to the lowest possible temperature and 5 parts by weight of finely powdered chloramine T were quickly added and milled in the shortest possible time. The stock was then slabbed off, placed immediately into molds under pressure, where it cured at room temperature in a relatively short time into a tough vulcanizate of excellent tensile strength.

EXAMPLE 5

A sample of polychloroprene was compounded on the mill according to the following recipe:

Recipe 4

| | Parts by weight |
|---|---|
| Polychloroprene | 100 |
| Zinc oxide | 3 |
| Stearic acid | 1.5 |
| Carbon black | 60 |
| Quinone dioxime dibenzoate | 6 |

This compound was prepared on the mill excluding the quinone dioxime compound until all the other components were well milled in. The mill was then cooled and the quinone dioxime milled in at good speed. When a reasonably good dispersion of the quinone substance had been obtained, 5 parts by weight of dichloro toluene sulfonamide were added rapidly and mixed in in the shortest possible time. The batch was then slabbed off, molded and allowed to stand at room temperature, during which time it yielded an excellent vulcanizate of excellent tensile strength and properties.

EXAMPLE 6

A portion of a copolymer of butadiene and styrene prepared from approximately 65 parts of butadiene and 35 parts of styrene was prepared in aqueous emulsion using soap as an emulsifier and a peroxide as a catalyst. The emulsion was then coagulated and the polymer separated, washed and dried. The polymer was then compounded according to the following Recipe 5:

Recipe 5

| | Parts by weight |
|---|---|
| Butadiene styrene polymer | 100 |
| Zinc oxide | 5 |
| Stearic acid | 3 |
| p-Quinone dioxime | 2 |

In this instance also, the dioxime was reserved until the other components were well mixed in, then the mill was cooled, the para quinone dioxime quickly added in, and the material slabbed off from the mill without too much regard for the production of a fully homogeneous mixture.

This compound was then dissolved in a light naphtha (Varsol) to produce a solution containing 20 parts of solids by weight. Simultaneously, a solution was made up consisting of 10 parts by weight of chloramine T in 100 parts by weight of methyl alcohol. To approximately 100 parts by weight of the naphtha solution there were then added 5 parts by weight of the alcohol solution of chloramine T. This solution was useable immediately as an excellent self-curing cement from which the naphtha evaporated at reasonably good speed and in which the curing reaction occurred during the evaporation. Upon standing, this mixture set to a fairly solid gel, which, however, in spite of its solid consistency, was an excellent cement which, upon evaporation of the solvent, dried down into a firm, fully cured lamina of excellent adhesive properties.

Thus the process of the invention activates a quinone dioxime curing agent by the admixture therewith of a chlorosulphonamide to yield a rapid and efficient curing action on an elastomer.

While there are above disclosed but a limited number of embodiments of the process and product of the present invention, it is possible to produce still other embodiments without departing from the inventive concept herein disclosed and it is therefore desired that only such limitations be imposed on the appended claims as are stated therein or required by the prior art.

The invention claimed is:

1. A composition of matter comprising a curable elastomer selected from the group consisting of copolymers of isobutylene with isoprene, copolymers of butadiene with acrylonitrile, polychloroprene, and copolymers of butadiene and styrene, a quinone dioxime in the proportion of 0.5% to 5% by weight of said elastomer, and a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of said elastomer.

2. A composition of matter comprising a curable elastomeric copolymer of a major proportion of isobutylene with a minor proportion of a multi olefin having from 4 to 14 carbon atoms per molecule, a quinone dioxime in the proportion of from 0.5% to 5% by weight of said copolymer, and a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of from 0.5% to 10% by weight of said copolymer.

3. A cement comprising in combination two liquid members, one member thereof comprising an organic solution of a curable elastomer selected from the group consisting of copolymers of isobutylene with isoprene, copolymers of butadiene with acrylonitrile, polychloroprene, and copolymers of butadiene and styrene together with a quinone dioxime in the proportion of 0.5% to 5% by weight of said elastomer, the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of said elastomer.

4. A cement comprising in combination two liquid members, one member thereof comprising an organic solution of a curable synthetic elastomeric olefinic polymer selected from the group consisting of copolymers of isobutylene with isoprene, copolymers of butadiene with acrylonitrile, polychloroprene, and copolymers of butadiene and styrene together with zinc oxide, stearic acid, and a quinone dioxime in the proportion of 0.5% to 5% by weight of said polymer, and the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substitutents on the aryl nucleus, in the proportion of 0.5% to 10% by weight of said polymer.

5. A cement comprising a solution of two liquid members, one member thereof comprising an organic solution of a curable synthetic elastomeric olefinic polymer selected from the group consisting of copolymers of isobutylene with isoprene, copolymers of butadiene with acrylonitrile, polychloroprene, and copolymers of butadiene and styrene together with zinc oxide, stearic acid, carbon black, and a quinone dioxime in the proportion of 0.5% to 5% by weight of said polymer, and the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of said polymer.

6. A cement comprising a solution of two liquid members, one member thereof comprising an organic solution of a curable synthetic elastomeric olefinic polymer selected from the group consisting of copolymers of isobutylene with isoprene, copolymers of butadiene with acrylonitrile, polychloroprene, and copolymers of butadiene and styrene together with zinc oxide, stearic acid, carbon black, sulfur, and a quinone dioxime in the proportion of 0.5% to 5% by weight of said polymer, and the other member, miscible therewith, comprising a solution of a chloro-substituted aryl sulfonamide having at least one aryl nucleus selected from the benzene and naphthalene aromatic series, having the chlorine atoms attached to the nitrogen atom, and containing hydrocarbon substituents on the aryl nucleus in the proportion of 0.5% to 10% by weight of said polymer.

7. A cement comprising a solution of two members, one member thereof comprising an organic solution of a curable synthetic elastomeric copolymer of a major proportion of isobutylene with a minor proportion of a multi olefin having from 4 to 14 carbon atoms per molecule, and a quinone dioxime in the proportion of 0.5% to 5% by weight of said copolymer, the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus in the proportion of 0.5% to 10% by weight of said copolymer.

8. A cement comprising a solution of two members, one member thereof comprising an organic solution of a curable synthetic elastomeric copolymer of about 97 mole per cent of isobutylene with about 3 mole per cent of isoprene, and a quinone dioxime in the proportion of 0.5% to 5% by weight of said copolymer, the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of said copolymer.

9. A cement comprising an organic solution of two members, one member thereof comprising a rubber-like copolymer of butadiene and acrylonitrile together with a quinone dioxime in the proportion of 0.5% to 5% by weight of said copolymer, the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of the copolymer.

10. A cement comprising a solution of two members, one member thereof comprising polychloroprene together with a quinone dioxime in the proportion of 0.5% to 5% by weight of the polychloroprene, the other member, miscible therewith, comprising a solution of a chloro-substituted aryl sulfonamide having at least one aryl nucleus selected from the benzene and naphthalene aromatic series, having the chlorine substituents attached to the nitrogen atom, and containing hydrocarbon substituents on the aryl nucleus, in the proportion of 0.5% to 10% by weight of the chloroprene.

LUTHER B. TURNER.
WINTHROPE C. SMITH.

REFERENCES CITED

The following references are of record in the file of this patent:

UNITED STATES PATENTS

| Number | Name | Date |
|---|---|---|
| 2,170,191 | Fisher | Aug. 22, 1939 |
| 2,393,321 | Haworth | Jan. 22, 1946 |
| 2,394,902 | Engelmann | Feb. 12, 1946 |
| 2,400,612 | Sprague | May 21, 1946 |
| 2,492,170 | Mast et al. | Dec. 27, 1949 |

FOREIGN PATENTS

| Number | Country | Date |
|---|---|---|
| 390,658 | Germany | Mar. 29, 1924 |

OTHER REFERENCES

Ind. and Eng. Chem., August 1939, page 942.